United States Patent [19]

Clark

[11] 4,039,439
[45] Aug. 2, 1977

[54] METHOD FOR DESTRATIFYING BODIES OF WATER

[76] Inventor: John W. Clark, 205 Hoagland, Las Cruces, Dona Ana, N. Mex. 88001

[21] Appl. No.: 511,007

[22] Filed: Oct. 1, 1974

Related U.S. Application Data

[63] Continuation-in-part of Ser. No. 282,930, Aug. 23, 1972, abandoned.

[51] Int. Cl.² .......................... C02B 1/00; C02C 5/12
[52] U.S. Cl. ...................................... 210/14; 210/170; 61/6; 261/121 R
[58] Field of Search .................. 61/6; 204/149–152, 204/129; 210/15, 63, 170, 192, 220, 221, 14, 199, 243; 261/1, 77, 121 R, 122–124

[56] References Cited

U.S. PATENT DOCUMENTS

| 3,336,220 | 8/1967 | Neidl | 210/243 |
|---|---|---|---|
| 3,347,537 | 10/1967 | Morgan | 210/14 |
| 3,505,213 | 4/1970 | Anthony et al. | 210/15 |
| 3,510,001 | 5/1970 | Baer et al. | 210/192 |
| 3,671,022 | 6/1972 | Laird et al. | 210/170 |
| 3,684,703 | 8/1972 | Marmo | 204/149 |
| 3,782,701 | 1/1974 | Hunt | 210/220 |
| 3,794,303 | 2/1974 | Hirshon | 261/123 |

*Primary Examiner*—Thomas G. Wyse
*Attorney, Agent, or Firm*—Samuel Meerkreebs

[57] ABSTRACT

A method for generating hydrogen bubbles electrolytically in the lower reaches of a body of water which is normally highly saturated with hydrogen; controlling the bubble size of the hydrogen bubbles within a range of from 100 to 600 microns so the hydrogen bubbles function as a vehicle to raise the oxygen deficient water to the surface, but the hydrogen bubbles substantially remain in the water near the surface of the body of water, moving along the surface thereof and move outwardly in a path therealong exposing the water so carried to natural aeration and sunlight; the range of the bubbles size being such as not to adhere to solid materials and carry them to the water surface to eliminate turbidity and the formation of floc.

3 Claims, 14 Drawing Figures

METHOD FOR DESTRATIFYING BODIES OF WATER

This application is a continuation-in-part of copending application Ser. No. 282,930 filed Aug. 23, 1972 and titled *Method and Apparatus for Destratifying Bodies of Water,* now abandoned.

BACKGROUND OF THE INVENTION

1. Field of the Invention

A method for destratifying substantially layered quiescent bodies of water to improve natural exposure conditions and to supplement the oxygen content; the quality of the water is improved and the quiescent character of the body of water is substantially maintained through relatively inexpensive apparatus and installations.

2. Description of the Prior Art

Various systems, methods and apparatus for oscillating, stirring, aerating bodies of water have been previously considered; see, for example, the following prior art U.S. Pat. Nos.: GROSS, 3,109,288, Nov. 5, 1963; SMITH, 3,320,928, May 23, 1967; SARE, 3,373,821, Mar. 19, 1968; WELLS, JR., 3,521,864, July 28, 1970; MENDELSON, 3,540,222 Nov. 17, 1970.

Because of the magnitude of the problem including moving huge bodies of water, energy that must be supplied, maintenance and repair of relatively expensive noisy equipment, excessive disturbance of the body of water at the bottom where natural purification processes are disturbed and a multitude of various factors, none of the prior art proposals appear to prove practical. The general approach of the prior art has been an attempt to areate the water premised on disolving oxygen in the water by introducing air; the installation of huge or banks of compressors add another environmental factor (increased noise level) as well as the failure to take into consideration the available natural energy forces that most effectively function to afford the energy for the type of water treatment that is most practical on a massive scale.

GENERAL BACKGROUND OF THE PROBLEM

Figure 1:
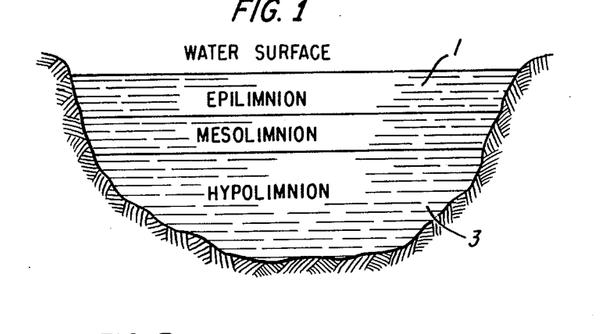
FIG. 1 is a diagramatic profile illustrating the natural stratification of a quiescent body of water.

Water masses in lakes, ponds, or other bodies of water are in delicate vertical and horizontal balance and their responses to external forces is consequently more sensitive and variable. FIG. 1, the epilimnion 1, the warmer layer of the water in the surface in summer, generally has better water quality except for higher temperature. The colder layer of the water on the bottom, the hypolimnion 3, has a lower temperature. The primary disadvantage here is that the oxygen content of the hypolimnion 3 is depleted through microbial activity. Since there is no opportunity for reaeration, anaerobic conditions set in with an increase in iron, carbon dioxide, manganese, hydrogen sulfide, and teaste and odor. All of these reactions are potentially detrimental to water quality.

This problem is further complicated where waste discharges are released into a lake or other body of water. The waste water contains food used by the bacteria and the oxygen supply is depleted more rapidly and the waste water tends to stagnate in layers dependent upon the temperature of the waste water and the temperature of the receiving water.

Figure 2:
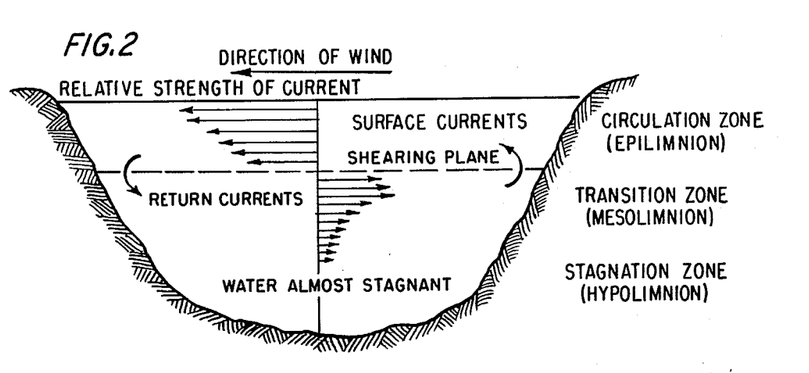
FIG. 2 is a diagramatic profile, similar to FIG. 1, showing the manner in which mixing occurs in a large body of water through wind action.

Wind provides some mixing in lakes as shown by FIG. 2. The degree of mixing and the depth to which mixing takes place is a function of both wind velocity and the decrease in temperature with water depth. The greater the decrease in temperature with depth, the greater is the resistance to mixing and the more the mixing will be confined to the upper layer of water.

When winter ends and spring begins, waters near the surface begin to warm up. Until the temperature of maximum density is reached, 4° C, surface water being more dense, sinks to the bottom. Similar conditions take place at other times of the year. These are rapid changes and produce too rapid a mixing in the lake so that bottom sediments and other undesirable qualities are produced in the water. As spring turns into summer, the surface water becomes progressively warmer. Soon lighter water overlies denser water once again and a stratification condition sets in for the summer period similar to FIG. 1. In effect, we normally have two lakes, one superimposed upon the other, with different qualities of water. These two lakes are rapidly mixed two or three times during the year with a resultant deterioration in total water quality.

Because molecular diffusion is relatively slow, thermal gradients of lakes and similar bodies of water are gradients in the concentration of dissolved gases. The water surface is both a window through which radiant energy from the sun is received and a lung through which oxygen is taken in and carbon dioxide and other dissolved gases are released. The oxygen absorbed at the surface is distributed by the water circulation. The gases of decomposition produced in the hypolimnion 3 are released by contact with the air overlying the water surface.

Seasonal movements in otherwise quiescent bodies of water cannot be totally controlled but the effects of these movements can be greatly reduced and total productivity and average water quality significantly increased by providing continuous low level mixing throughout the year.

Additionally, in sewage lagoons, small inlets for boats or harbor installations, during freezing of the surface water, natural aerobic purification process can no longer occur because of surface ice; removing or preventing ice formation must be accomplished mechanically, for example, eith the attendent costs and loss of time; and heating is not only impractical and disturbs the ecological balance which has its resultant detrimental effect on the animal life dependent on a balanced system.

Over 50 million people in the United States are supplied by municipal water from reservoirs and many of the water suppliers are presently providing some form of artificial destratification. Present known art techniques use either compressed air, mechanical pumps, mechanical mixing apparatus etc. Purchase and installation costs of known devices costs about $1.00 per acre-foot per year. All the known mechanical equipment has a relatively short mechanical-life since the equipment must function continuously.

SUMMARY OF THE INVENTION

A method for improving the quality of large bodies of water so that the general overall quality thereof is improved comprising emplacing in the lower reaches of a large body of water means for generating hydrogen and utilizing the bouyancy of the hydrogen as a vehicle to carry the hydrogen-saturated water to the surface and thereacross so that the hydrogen-saturated water is subjected to natural aeration and sunlight without the vehicular hydrogen substantially leaving the surface of the body of water.

The method as set forth above in which the hydrogen is produced electrolytically in conjunction with oxygen and in which the hydrogen bubble sizes are controlled within a range of from 100 to 600 microns and secondary benefits are provided in that the oxygen generated combines with the hydrogen-saturated water in the lower reaches of the body of water to tend to improve bacterial conditions in the lower reaches of the body of water.

DESCRIPTION OF THE PREFERRED EMBODIMENTS AND METHOD

As has been pointed out above in the "General Background of the Problem," the problem conditions with respect to stratified water bodies have been set forth, and the problems occurring due to seasonal changes are also set forth. Further, the optimum, "water window" surface for water treatment is brought out. Further, presently installed mechanical equipment, of the prior art, requires about 0.004 HP/acre-foot of reservoir, on the average; contrary to the prior art, the apparatus, system and method of the present invention, utilizes the natural energy provided by nature (to its greatest advantage) and uses the natural phenomena and physical characteristics of water, sunlight, surface aeration, etc. to their greatest advantage.

In FIG. 1 the epilimnion contains the warmer layer of water in the surface during the summer season and generally has better quality water except for its higher temperature. The cooler layer on the bottom, the hypolimnion, has a lower temperature. During the condition illustrated, the primary disadvantage here is that the oxygen content of the hypolimnion is depleted; at the very lower region of the lake or reservoir, since oxygen is limited, and there is no opportunity for reaeration, anaerobic conditions occur with an increase in iron, carbon dioxide, manganese, hydrogen, sulfide, and undesirable taste and odor; all of these elements are factors lending to potentially undesirable water quality. The discharge of waste into a lake, harbor, lagoon or other bodies of relatively still water further complicates factors lending to poor quality of the epilimnion.

As illustrated in FIG. 2, the wind provides some mixing, however, the degree of mixing that takes place is a function of both wind velocity and the decrease of temperature with depth; the greater the decrease in temperature with depth, the greater is the resistance to mixing and the greatest portion of mixing is confined to the upper layer.

With the changing seasons, i.e. winter to spring, as the water near the surface warms up and reaches the temperature of maximum density, 4° C, the surface water which becomes more dense sinks to the bottom; similar conditions occur at other times of the year, however, these are relatively sudden changes and generally produce too rapid a mixing so that bottom sediments and other undesirable qualities are produced in the water. Progressive warming results in the lighter water substantially attaining a stratified condition and in effect defines superimposed lake layers which rapidly mix two or three times a year with resultant deterioration of the total water quality.

Of course, seasonal movements of normally quiescent bodies of water cannot be totally controlled but the effects of these movements can be radically reduced and total productivity and average water quality significantly increased by providing continuous, low level mixing throughout the year. The optimum would generally be if the lowermost portions of the hypolimnion were to contain sufficient oxygen and the present invention lends itself toward the ultimate goal of attaining this optimum.

Figure 3:
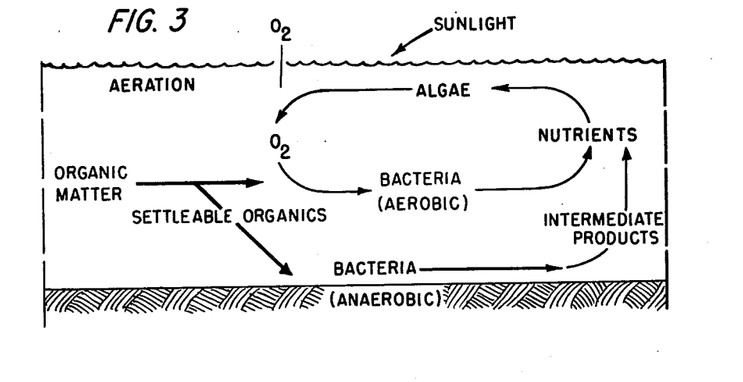
FIG. 3 shows, in theory, how water near the bottom of a reservoir or large body of water, normally low in oxygen content or has none in solution, is carried to the surface to obtain surface treatment and areation, as well as illustrating the bacterial action-cycle.

In FIG. 3, there is illustrated how the water near the bottom of the reservoir or lake is slowly carried to the surface. Gases produced near the bottom are released to the surface atmosphere and oxygen is transferred from the surface atmosphere to the water.

In the present invention, an electrolytic pump or water motive means generates gas (molecular oxygen and hydrogen) in which some of the oxygen is absorbed and released (near the bottom) and the remaining hydrogen and oxygen bubbles carry the water at the bottom to the surface, cause an increase of surface reaeration of the water in the reservoir, lake, etc., improves the overall water quality along with increasing lake biologic productivity to support the more beneficial forms of life such as fish. Just as important is the very gentle mixing achieved by the fine bubbles generated by the relatively noiseless electrolytic pump means, this lending itself to attain the goal toward producing a homogeneous mixture rather than the characteristic stratification.

It is very important to understand that this method is not one of substituting gas produced by electrolysis for air in conventional aeration devices. In this method, the oxygen produced by electrolysis is not critical to the aeration process. The principal source of oxygen is from the atmosphere through the increase of natural re-aeration brought about by the method.

Oxygen and hydrogen are produced by electrolysis from electrodes placed near the bottom of a body of water. The oxygen normally goes into solution and is helpful but not as important to the method as the hydrogen. Hydrogen is less soluble in water than oxygen and the water in a stratified body of water is usually near saturation with hydrogen because of the release of hydrogen in anaerobic processes in this region of the water depth and from the bacterial activity in mud and sediment layers of the bottom of the body of water. As hydrogen gas is produced by electrolysis the volume of water in the immediate vicinity of the electrodes becomes bouyant and rises to the surface. As this volume of water reaches the surface, all of the vehicular hydrogen is not released to the atmosphere but some hydrogen remains suspended in the volume of water and due to continued bouyancy this water floats on top of the body of water, moving away from the point of vertical rise above the electrodes. Therefore, this volume of water from the bottom of the basin now floats along the surface of the water and natural reaeration is immediately increased as oxygen moves from the atmosphere to reach equilibrium with the new oxygen deficient (hydrogen-saturated) water at the surface. This process continues until all of the water is saturated with oxygen.

The size of the hydrogen bubble is critical in this method. If the hydrogen bubble is too large, the bubble leaves the surface of the water immediately above the electrode and does not cause the bottom water to spread out over the water surface. If the bubble is too small, little mixing occurs and the water near the electrodes merely becomes super saturated with hydrogen and this produces a flotation effect on particulate material suspended in the water in the vicinity of the electrodes. Due to super saturation, small bubbles form on the surface of particulate material and causes the material to be raised to the water surface. For the method to be effective, the size of the hydrogen bubble must be controlled between 100 and 600 microns. When the hydrogen bubbles are larger than 600 microns in diameter, the bubbles leave the surface too rapidly and the newly raised water volume does not continue to float across the water surface. If the hydrogen bubbles are less than 100 microns in diameter, little mixing surface exposure occurs and the natural reaeration is not as significantly increased.

Projected costs and available data reveal that prior art mechanical installations (although not presently satisfactory) cost about $1.00 per acre-foot for 50,000 acre-foot reservoir, while cost for the electrolysis pump system would be about $0.50 per acre-foot; accordingly, cutting installations costs in half. Operating costs in mechanical installations are about $0.25, annually, per acre-foot per year, while the electrolysis pump system contemplates about $0.03 per acre-foot per year under the same conditions.

The maintenance and noise problems cannot be overlooked in mechanical systems, while the projected maintenance and noise is relatively nil in the electrolysis pump system; the noise problem is completely eliminated, as compared with mechanical compressors installed in banks along a recreational reservoir, for example.

The electrolysis pump system provides another important benefit or result since oxidation of ferrous iron results in ferric iron and consequent chemical percipitation of phosphorous by the insoluble ferric iron and the formation of a barrier of insoluble iron-phosphate complexes in the top layer of the reservoir sediments which accordingly decreases the rate of defusion of chemicals from the bottom sediments. It is important that mixing be gentle to deter phosphate concentration of the overlying water as often happens in mechanical mixing contrary to that which occurs in the electrolysis pump system of the present invention.

The suppressing of phosphates is extremely important because of the major problems of lake enrichment resulting from detergent soaps, for example. The model analysis, using lake bottom sediments, at the end of 6 weeks, the orthophosphate content of the water without mixing was 2.10 mg/liter, while using the electrolysis pump system mixing, orthophosphate content was reduced to 0.15 mg/liter. The ferrous iron, during the same model analysis was 0.41 mg/liter, and with the electrolysis pump system mixing was 0.15 mg/liter during the same period of time.

In order to evaluate the operation of the electrolytic gas pumping device, the following tests were run:
all tests were conducted on a tank 20 ft. wide by 40 ft. long and approximately 6 ft. deep, with a depressed bottom drain of about 9 ft. deep at the center;
a 6 mill plastic sheet with slits at measuring stations was used to cover the water surface between runs;
the dissolved oxygen was removed from the water by the addition of sodium sulfite with cobalt chloride added as a catalyst;
the tank was completely mixed during the addition of chemicals with a closed pumping device. The tests were conducted starting on a one day and continued through the next day.
The current was adjusted to 4 amps. in each test but the surface area of the electrodes was changed to vary bubble sizes;
at the completion of each test, the plastic sheet was replaced and the dissolved oxygen profile measured with a standard D.O. probe. From this information the oxygen added by reaeration was calculated.

|  | Test No. 1 | | | | | | | |
|---|---|---|---|---|---|---|---|---|
|  | D.O. at start: | | | 1.2 mg/l. | | | | |
|  | Temp.: | | | 19° C | | | | |
|  | Bubble Size: | | | 160 Microns | | | | |
|  | STATION | | | | | | | |
|  | 1 | 2 | 3 | 4 | 5 | 6 | 7 | 8 |
| 0.1 | 8.7 | 8.7 | 8.8 | 8.9 | 8.9 | 8.7 | 8.7 | 8.6 |
| 1 | 8.6 | 8.6 | 8.6 | 8.7 | 8.7 | 8.5 | 8.6 | 8.6 |
| 2 | 8.0 | 8.0 | 8.2 | 8.2 | 8.6 | 8.6 | 7.7 | 7.8 |
| 3 | 6.8 | 6.7 | 6.7 | 6.8 | 7.2 | 7.1 | 7.0 | 6.7 |
| Depth 4 | 4.1 | 4.0 | 3.9 | 4.0 | 4.0 | 4.0 | 3.9 | 3.9 |
| ft. 5 | 1.8 | 1.5 | 1.4 | 1.5 | 1.5 | 1.5 | 1.5 | 1.7 |
| 6 | 1.2 | 1.2 | 1.2 | 1.3 | 1.3 | 1.2 | 1.2 | 1.2 |

|  | RUN No. 2 | | | | | | | |
|---|---|---|---|---|---|---|---|---|
|  | D.O. at start: | | | 1.2 mg/l. | | | | |
|  | Temp: | | | 19° C | | | | |
|  | No Electrolysis | | | | | | | |
|  | 1 | 2 | 3 | 4 | 5 | 6 | 7 | 8 |
| 0.1 | 8.6 | 8.6 | 8.6 | 8.6 | 8.6 | 8.6 | 8.6 | 8.6 |
| 1 | 1.3 | 1.3 | 1.3 | 1.3 | 1.3 | 1.3 | 1.3 | 1.3 |
| 2 | 1.2 | 1.2 | 1.2 | 1.2 | 1.2 | 1.2 | 1.2 | 1.2 |
| 3 | 1.2 | 1.2 | 1.2 | 1.2 | 1.2 | 1.2 | 1.2 | 1.2 |

-continued

| | | 1 | 2 | 3 | 4 | 5 | 6 | 7 | 8 |
|---|---|---|---|---|---|---|---|---|---|
| Depth ft. | 4 | 1.2 | 1.2 | 1.2 | 1.2 | 1.2 | 1.2 | 1.2 | 1.2 |
| | 5 | 1.2 | 1.2 | 1.2 | 1.2 | 1.2 | 1.2 | 1.2 | 1.2 |
| | 6 | 1.2 | 1.2 | 1.2 | 1.2 | 1.2 | 1.2 | 1.2 | 1.2 |

RUN No. 3

| D.O. at start: | 1.1 mg/l. |
|---|---|
| Bubble Size: | 70 Microns |
| Temp.: | 19° C |

| | | STATION | | | | | | | |
|---|---|---|---|---|---|---|---|---|---|
| | | 1 | 2 | 3 | 4 | 5 | 6 | 7 | 8 |
| | 0.1 | 8.6 | 8.6 | 9.1 | 9.7 | 9.6 | 9.3 | 8.6 | 8.6 |
| | 1 | 1.3 | 1.2 | 3.1 | 9.1 | 9.1 | 3.8 | 1.2 | 1.2 |
| | 2 | 1.1 | 1.1 | 1.2 | 8.6 | 8.8 | 1.1 | 1.1 | 1.1 |
| Depth | 3 | 1.1 | 1.1 | 1.1 | 8.2 | 8.3 | 1.1 | 1.1 | 1.1 |
| feet | 4 | 1.1 | 1.1 | 1.1 | 7.4 | 7.4 | 1.1 | 1.1 | 1.1 |
| | 5 | 1.1 | 1.1 | 1.1 | 6.7 | 6.9 | 1.1 | 1.1 | 1.1 |
| | 6 | 1.1 | 1.1 | 1.1 | 4.3 | 4.1 | 1.1 | 1.1 | 1.1 |

RUN No. 4

| Dissolved Oxygen: | 1.3 mg/l. |
|---|---|
| Temp: | 19° C |
| Bubble Size: | 900 Microns. |

| | | STATION | | | | | | | |
|---|---|---|---|---|---|---|---|---|---|
| | | 1 | 2 | 3 | 4 | 5 | 6 | 7 | 8 |
| | 0.1 | 8.5 | 8.5 | 8.7 | 8.8 | 8.8 | 8.8 | 8.5 | 8.5 |
| | 1 | 4.1 | 6.2 | 8.5 | 8.8 | 8.7 | 8.6 | 6.8 | 3.9 |
| Depth | 2 | 1.3 | 1.3 | 8.1 | 8.8 | 8.8 | 8.0 | 1.3 | 1.3 |
| ft. | 3 | 1.3 | 1.3 | 4.2 | 8.6 | 8.8 | 4.1 | 1.3 | 1.3 |
| | 4 | 1.3 | 1.3 | 1.4 | 8.7 | 8.8 | 1.5 | 1.3 | 1.3 |
| | 5 | 1.3 | 1.3 | 1.3 | 8.8 | 8.8 | 1.3 | 1.3 | 1.3 |
| | 6 | 1.3 | 1.3 | 1.3 | 8.7 | 8.7 | 1.3 | 1.3 | 1.3 |

Dye studies were made under each condition and visual inspection of the dye movement confirmed the mixing indicated by the dissolved oxygen profiles.

Conclusions from these and other studies, it was determined that if hydrogen bubbles are too small (less than 100 microns) little mixing occurs and the principal effect is flotation produced vertically above the immediate vicinity of the electrodes. If the hydrogen bubbles are too large (greater than 600 microns) the bubbles leave the water surface immediately above the electrodes and the horizontal movement of the lifted water at the surface does not take place. This is the heart of the method, the hydrogen bubbles must be large enough to produce mixing and small enough so that a significant percentage of the bubbles remain in and on the water in order to maintain the bouyancy and cause the lifted water to float on the surface, moving away from the point of surfacing.

Run No. 2

Run number 2 was conducted without the electrolysis cell with all other conditions similar. Natural reaeration contributed 0.19 lbs. of oxygen to the surface of the liquid in 1 hour.

Run No. 3

Run number 3 was conducted with the hydrogen bubbles averaging about 70 microns in diameter. Most of the hydrogen bubbles were too small to provide effective circulation. This resulted in super saturation around the electrodes with these small bubbles attaching to particulate matter in suspension and floating this fine material to the water surface. A foam froth formed at the water surface immediately over the electrodes. Some of the bubbles were larger than 70 microns and contributed to reaeration at the water surface, 0.77 lbs. of oxygen was added to the tank by natural reaeration in a 1 hour period.

Run No. 4

Run number 4 was conducted with the electrodes reduced in size and using a high current density. The bubbles were formed so rapidly that they were about 900 microns in diameter before they left the electrode surface. By comparison, the smallest bubbles using air diffusion devices are about 1,000 microns in diameter. Considerable mixing was evident in the immediate vicinity above the electrodes but the bubbles were so large that they left the water upon reaching the surface. Horizontal movement of the bubbles at the surface did not reach the walls of the tank. This was evidenced by both the dissolved oxygen profiles and the diffusion of the dye. Reaeration was increased by 1.1 lbs. of oxygen in 1 hour.

Run No. 1

With run number 1 the bubbles were maintained at about 160 microns in diameter. In this range of bubble size there was considerable mixing and the horizontal movement of the water at the surface reached the tank wall in 15 minutes. This was evidenced both by the dye study and by dissolved oxygen profiles. It is believed that; if the tank surface had been larger, there would have been a much greater difference between the amount of oxygen added by natural reaeration as the effective width of the tank was reached in 15 minutes with run number 1 and was not reached in 1 hour by the other runs. Natural reaeration added 1.35 lbs. of oxygen to the tank in 1 hour with the bubbles maintained at about 160 microns size.

By maintaining the hydrogen bubble diameter between 100 and 600 microns natural reaeration can be substantially increased in bodies of water by this electrolyic gas pumping device. The surface area of influence is increased several fold for ice removal or prevention and a general benefit is observed in the natural water quality.

Figure 4:
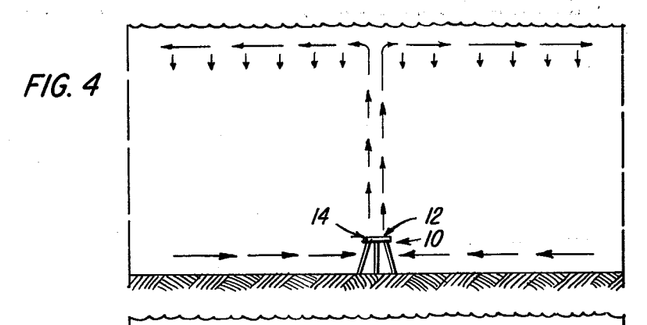
FIG. 4 is a diagrammatic profile illustrating, on an enlarged scale, the path of movement of water in which the electrolysis pump means of the invention is installed.
Figure 6:
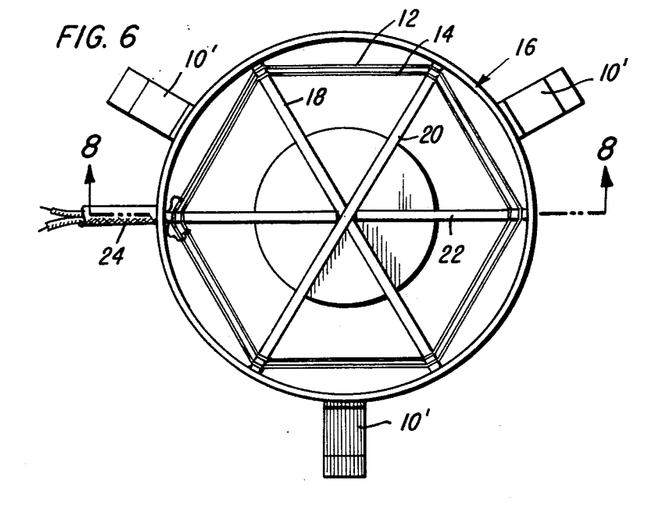
FIG. 6 is a top plan view, on a larger scale, of the electrolysis pump of FIG. 5.
Figure 7:
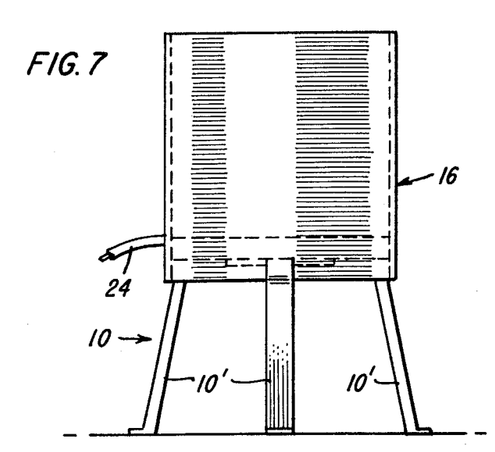
FIG. 7 is a side elevation of FIG. 6.
Figure 8:
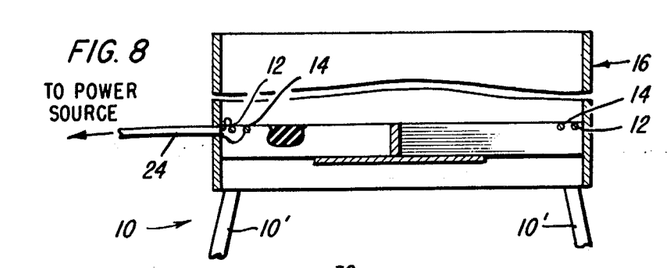
FIG. 8 is a section taken on the plane of line 8—8 of FIG. 6.

Referring to FIGS. 4 and 6, in FIG. 4, electrodes are installed on a suitable support base 10 with the cathode 12 and anode 14 being spaced about ⅛ inch apart and comprising 0.06 centimeter diameter platinum wire. The relatively close spacing of the electrodes, within operational limits, minimizing current flow; and at depths of 114.5 feet of water, current densities from less than 0.05 amps per square centimeter to 6.0 amps per square centimeter of electrode surface are applied. Ultimate bubble size will be constant for a relatively wide range of current densities about 0.4 amperes per square centimeter of electrode surface. This produces a bubble of about 1.0 millimeters in diameter which rises at the rate of 0.9 to 1.0 feet/sec. At current densities above 1.5 amperes per square centimeter of electrode surface, increasing numbers of larger bubbles (greater than 5 millimeters diameter) are formed and these larger bubbles tend to produce turbulence and have a rather erratic vertical assent path. Through the use of electrodes having a circular cross section, disposed horizontally, the bubbles rise uniformly, in a vertical path, apparently do not collide with each other (where bubble from a flat plate electrode combine and form too large a bubble with accompanying erratic paths and turbulence). With ascendancy using current ranges from 0.4 amp/sq. to 1.5 amp/sq. centimeter of electrode, uniform, non-turbulent bubbles of molecular oxygen and hydrogen are produced, and the bubbles apparently develope with relative position with respect to each other at about 1 foot above electrodes. The bubbles of molecular oxygen generated at the low reaches of the reservoir are substantially absorbed and do not always ascend to the surface. The molecular hydrogen bubbles rise in a uniform path, and upon reaching the surface change the relative specific gravity of the water surrounding the source of the bubbles.

Figure 5:
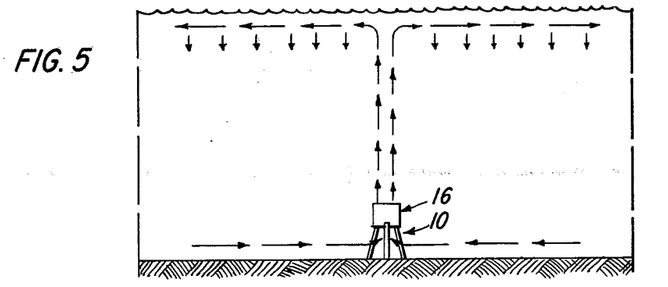
FIG. 5 is a view similar to FIG. 4 utilizing a preferred embodiment of the electrolysis pump means.

In FIG. 5, the electrolytic pump means comprises in addition to a support base 10', pairs of cathodes and anodes 12', 14' are suitably supported in a mutually insulated relation within a tubular collar 16 in a generally polygonal relationship at the periphery within the collar and including a plurality of diametrical transverse supports 18-22. The utilization of a collar 16, will cause a defined circuit of flow of water through the bottom of the cylinder (due to rising gas bubbles) replacing the bubbles moving upwardly through the cylinder which causes a pressure differential in the cylinder resulting in the water circulation adjacent the bottom of the reservoir etc.

The cathode-anode pair providing the electrolytic action, is connected through suitable conductors 24 to a power source, the details of the power source are conventional. The current being applied as D.C., utilizing conventional means for reversing current flow to maintain the electrodes free to deposits etc.

Figure 9:
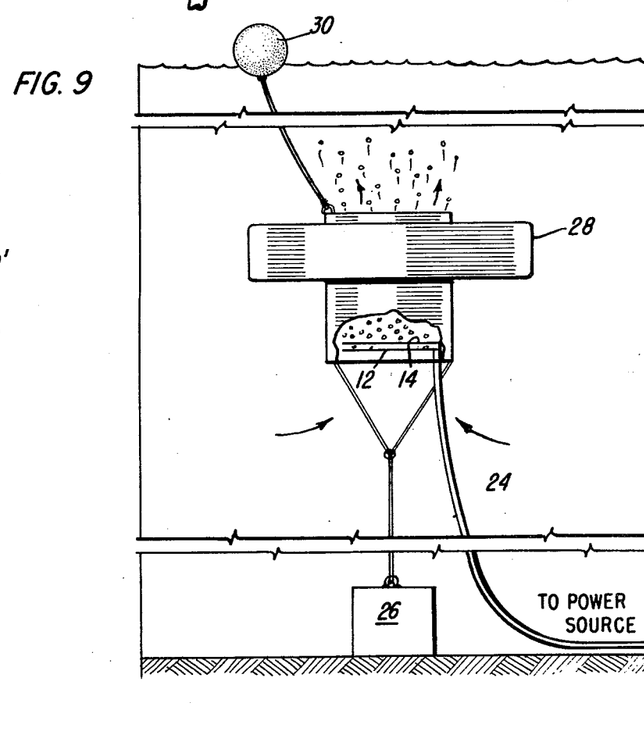
FIG. 9 is a diagramatic illustration showing another mode of installation of the electrolysis pump of FIG. 5.

In FIG. 9, the cylindrical type electrolysis pump is anchored at 26 and includes a flotation collar 28 to which is attached a marking bouy and line 30; this permitting ready location of the electrolysis pumps (facilitating relocation) depending upon conditions of the body of water in which they are installed.

Figure 10:
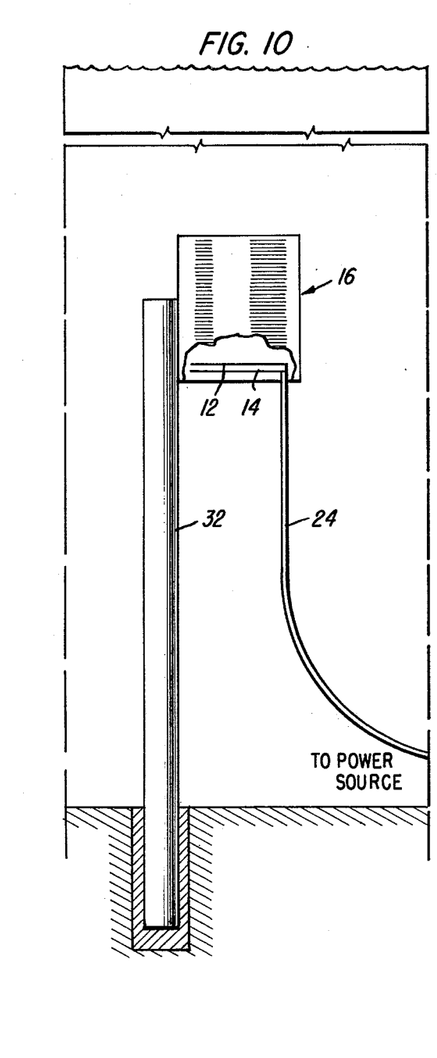
FIG. 10 is another diagramatic illustration showing another mode of installation of the electrolysis pump of FIG. 5.

In FIG. 10, there is shown vertical post 32, embedded in the bottom of the reservior etc., upon which the electrolytic pump is mounted.

Figure 11:
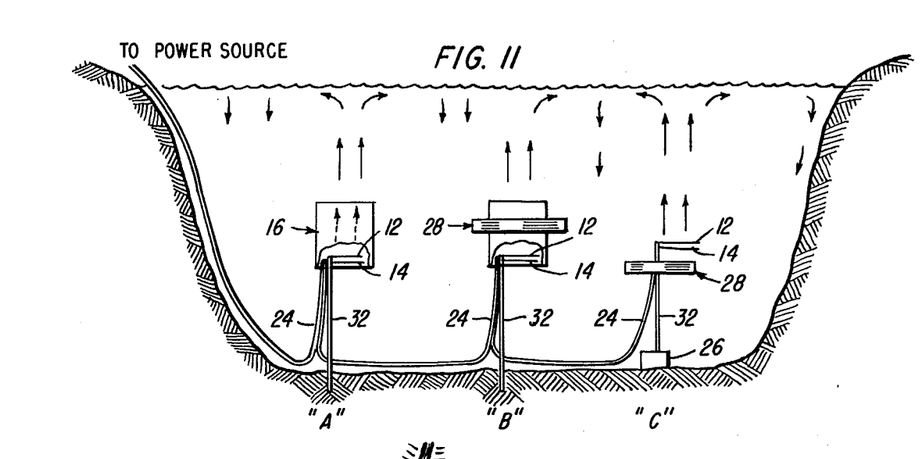
FIG. 11 is a diagramatic section of a quiescent body of water showing electrolysis pumps installed using the modes of both FIGS. 9 and 10.

In FIG. 11, there are shown the various types of supports, discussed above, and showing theoretically how the gas bubbles generated cause circulation of the character desired to obtain destratification of the character desired.

Figure 12:
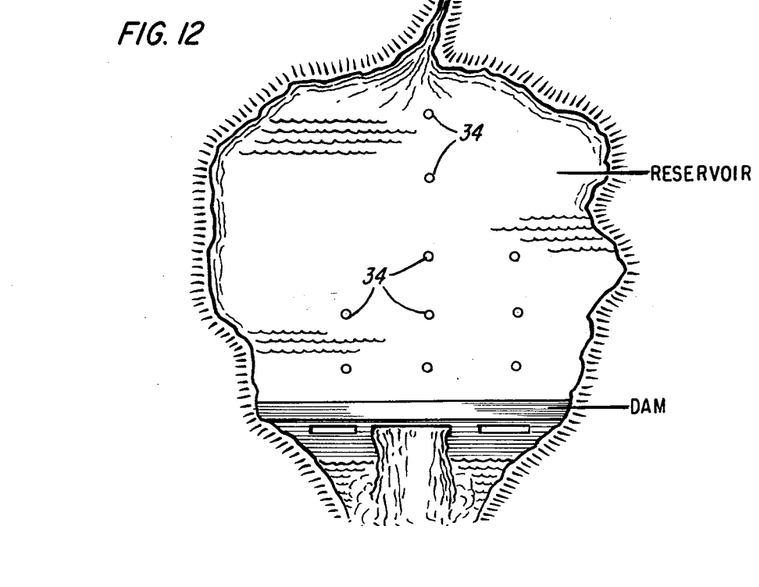
FIG. 12 is a diagramatic plan view illustrating an electrolysis pump system installed in a reservoir behind a dam, i.e. where the pumps are installed only in deepest water where the major disbenefits to water quality occur.

In FIG. 12, the plan view of a typical dam is illustrated, and the general location of electrolytic pumps are shown at 34, it being noted that only about 25 percent of the body of water need incorporate the electrolytic pumps; these being located in the deepest reaches, i.e. immediately behind the dam.

Comparing the theoretical energy requirements for destratification of a body of water utilizing conventional mechanical equipment and electrolytic gas pump generating means, the following clearly illustrates the unusual advantages from a cost and dissolved oxygen standpoint.

The theoretical energy requirement is the work that must be done to a body of water to lift the entire weight of the body of water the vertical distance between the center of gravity when the body of water is in a given state of stratification and the center of gravity when the body of water is isothermal. Or it may be thought of as the minimum energy required to mix completely a stratified body of water when the water is assumed to be an ideal liquid.

This value is dependent upon the temperature variation within the reservoir and the actual shape of the reservoir. Assuming a typical shape and temperature profile for a natural stratified 1,200 acre foot body of water varying from 28° C at the surface to 9° C at the bottom with a 28 ft. average depth, it would require about 10 kw hrs. of energy of mixing. Naturally the work required will always be more than this because this calculation assumes water to be an ideal (frictionless) fluid.

Conventional mechanical equipment would require about 300 times this amount of energy, while the Gas Pump would require about 60 kw hrs., or about 6 times the theoretical amount to mix this body of water to nearly constant temperature condition.

Figure 13:
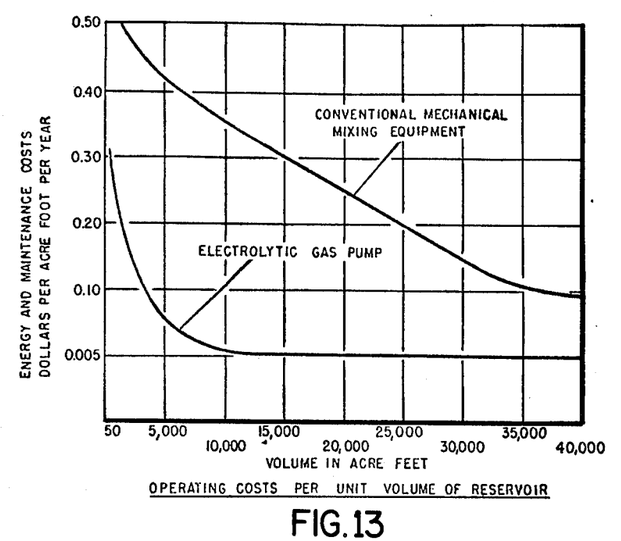
FIG. 13 is a graphic showing of operating costs per unit volume of reservoir and comparing "conventional mechanical mixing equipment" and the "electrolytic gas pump" of the invention.

Referring to FIG. 13, it will be observed that the initial installation of the electrolytic gas pumps is considerably less expensive to initially install and maintain per acre foot, ie.e, it is upwards of 1.00 dollars per acre foot for the conventional mechanical, mixing equipment as compared with about 0.50 dollars per acre foot; likewise the cost for treating an acre foot decreases appreciably and quickly levels off at about 14,000 acre feet where the treatment costs are about 0.005 dollars per acre foot. When using conventional mechanical equipment, costs do not level off until at about 37,000 acre feet and the costs for mixing run about 0.10 dollars per acre foot.

Figure 14:
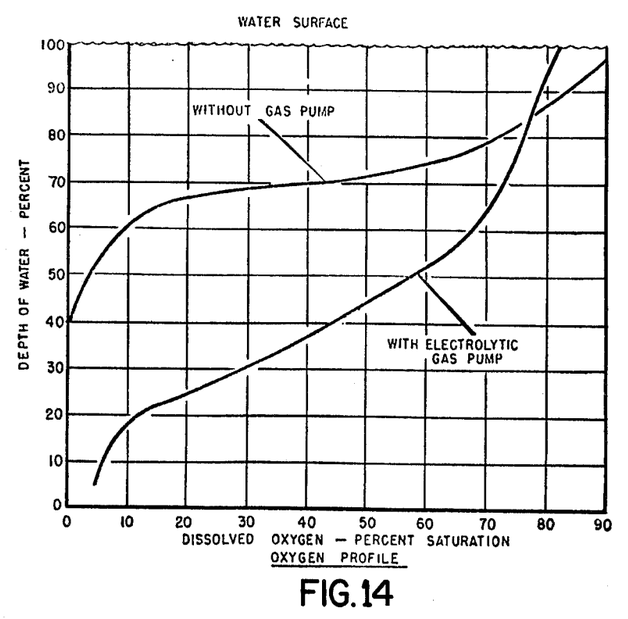
FIG. 14 is a graphic comparison of the oxygen profile of water "without a gas pump" as compared with a body of water incorporating an electrolytic gas pump.

FIG. 14 shows that without mixing, percentage oxygen saturation is substantially zero feet from the bottom at a depth of 100 feet without the use of the gas-type mixing apparatus, by using the apparatus and system of the invention, we can attain about 6 percent oxygen saturation at a depth of 100 feet in addition to the destratification mentioned above.

Briefly reviewing the advantages of the Gas Mixing device utilizing electrolytic action:

1. Efficiency of the apparatus increases with depth;
2. The gas bubbles generated are extremely small; in comparison with air compressors etc., thus affording greater efficiency by exposing greatest surface exposure of the gas bubble to the water through which it rises;
3. Gas bubbles controlled within a 100-600 micron range spread uniformly over a predetermined area and afford ideal lift conditions for hydrogen-saturated water;
4. Turbulent conditions are substantially eliminated at the lower depths to accordingly maintain ecological banace and optimum bacterial development and bacteria purification action and oxygen generated provides a secondary benefit to the ecological balance;
5. Maintenance is very low since there are no moving mechanical parts and the apparatus can be readily relocated when necessary and energy is not wasted in pumping gases since the energy is immediately concentrated at its point of expenditure, i.e. at the bottom,
6. There is no interference with the normal surface use of the body of water, i.e. recreational use, is in no manner impeded and is in fact enhanced by providing a purer water etc.;
7. The noise factors are eliminated as compared with the noises emitted through gas operated compressors and the air contamination accompanying gasoline operated motors;
8. Control is more exact since the line voltage electrode, sizes and shapes etc., can be readily controlled.

What is claimed is:

1. A method for destratifying and mixing large bodies of water for increasing natural surface aeration, improving the habitant for acquatic life, removing and/or preventing formation of ice, and improving the general quality of the water for domestic and industrial use, comprising the steps of:

a. emplacing electrolytic-gas generating means adjacent the lower reaches of a large body of water in which the water thereat is normally hydrogen-saturated;

b. electrolytically generating hydrogen gas bubbles as a lifting vehicle beneath the surface of the water at the lower reaches; and c. maintaining the hydrogen bubble size range from 100 to 600 microns in diameter so that the bubble size is not so small as to adhere to particulate matter and cause turbulence in the lower reaches of the body of water and of a size large enough to lift on the hydrogen-saturated water and lift it to the surface of the body of water and substantially spread thereover to expose the hydrogen-saturated water to natural aeration at the surface by maintaining the oxygen-depleted water in substantial contact with the atmosphere.

2. The method as claimed in claim 1 including the steps of confining the gases generated in a vertical column adjacent the lower reaches of the body of water so that hydrogen gas lifts with it hydrogen-saturated water can cause a defined circulatory path comprising, vertical movement in the body of water and horizontal movement at the surface of the body of water.

3. The method as claimed in claim 2 including providing the electrolytic gas generating means with an anode and cathode spaced at a minimum distance from each other and disposed horizontally, forming the cathode and anode with a circular cross section so that the bubbles generated will not substantially aglomerate and stay within the size range of from 100–600 microns.

* * * * *